3 Sheets—Sheet 1.

J. M. DUNCAN.

Assignor to the DUNCAN SALT COMPANY.

EVAPORATING PAN.

No. 11,061. Reissued Feb. 18, 1890.

Joseph M. Duncan Inventor.

Theo. L. Popp
C. J. Buchholz } Witnesses.

By Wilhelm & Bonner
Attorneys.

J. M. DUNCAN.

Assignor to the DUNCAN SALT COMPANY.

EVAPORATING PAN.

No. 11,061. Reissued Feb. 18, 1890.

Theo. L. Popp
J. Buchheit
Witnesses.

Joseph M. Duncan Inventor.
By Wilhelm & Bonnell
Attorneys

J. M. DUNCAN.

Assignor to the DUNCAN SALT COMPANY.

EVAPORATING PAN.

No. 11,061. Reissued Feb. 18, 1890.

Witnesses:
Theo. L. Popp.
A. J. Buchheit.

Joseph M. Duncan Inventor.
By Wilhelm Bonnet.
Attorneys.

UNITED STATES PATENT OFFICE.

JOSEPH M. DUNCAN, OF SILVER SPRINGS, NEW YORK, ASSIGNOR TO THE DUNCAN SALT COMPANY, OF SAME PLACE.

EVAPORATING-PAN.

SPECIFICATION forming part of Reissued Letters Patent No. 11,061, dated February 18, 1890.

Original No. 396,331, dated January 15, 1889. Application for reissue filed April 15, 1889. Serial No. 307,380.

*To all whom it may concern:*

Be it known that I, JOSEPH M. DUNCAN, of Silver Springs, in the county of Wyoming and State of New York, have invented new and useful Improvements in Evaporating-Pans, of which the following is a specification.

This invention relates to that class of evaporating-pans which are more especially used for evaporating brine in the manufacture of salt, and which are provided with internal heating-pipes for boiling the brine.

The object of my invention is to construct these heating-pipes in sections in such a manner that the same can be readily removed from the evaporating-pan for cleaning when necessary, and also to provide the pan with means whereby a constant circulation of the brine around the sections of heating-pipes is maintained.

The invention has the further object to improve the construction of the pan in various other respects.

The invention consists of the improvements which will be hereinafter fully set forth, and pointed out in the claims.

Figure 1:
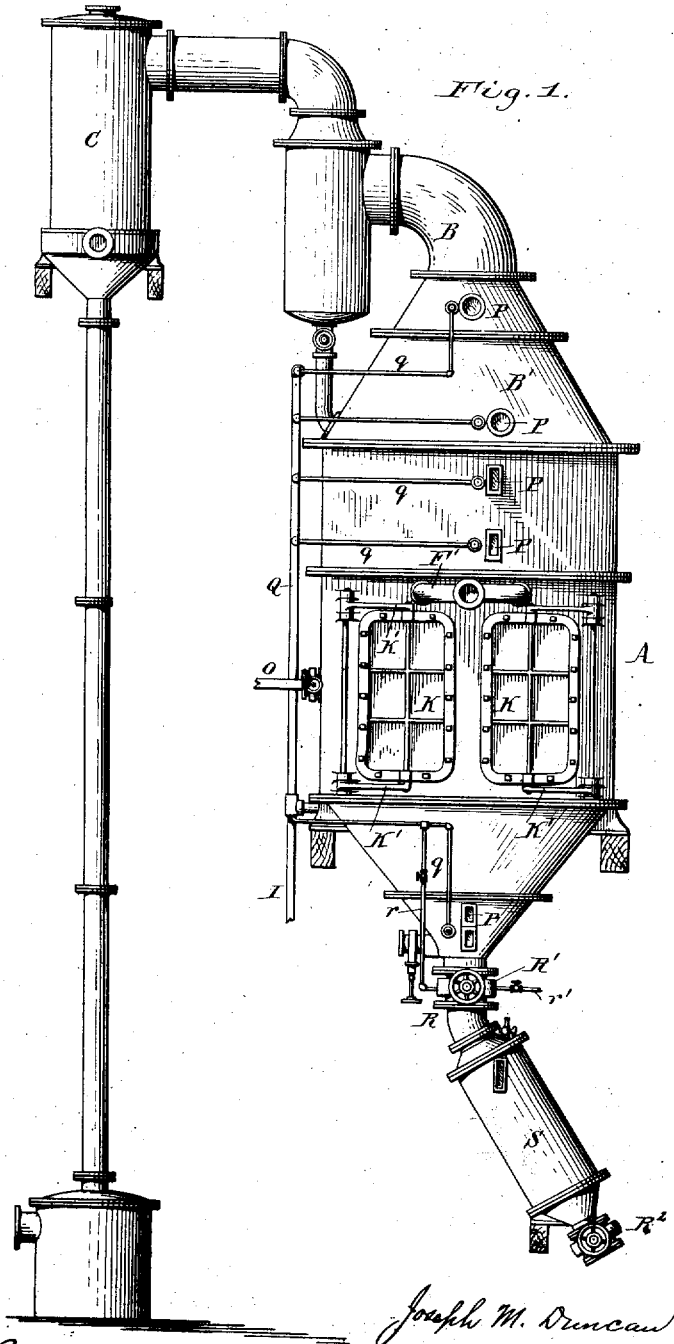
Figure 2:
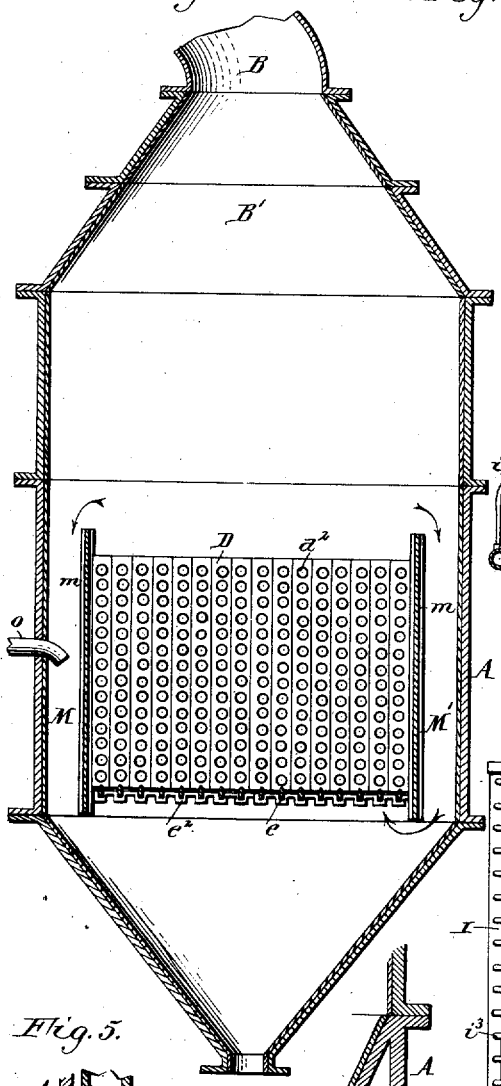
Figure 3:
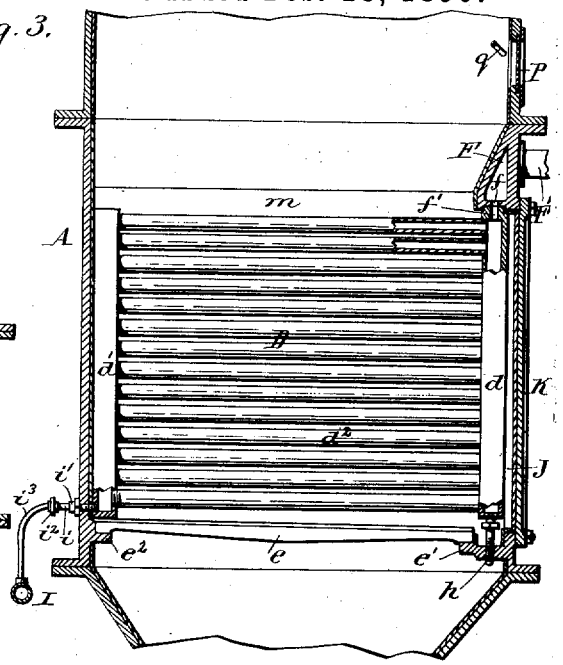
Figure 4:
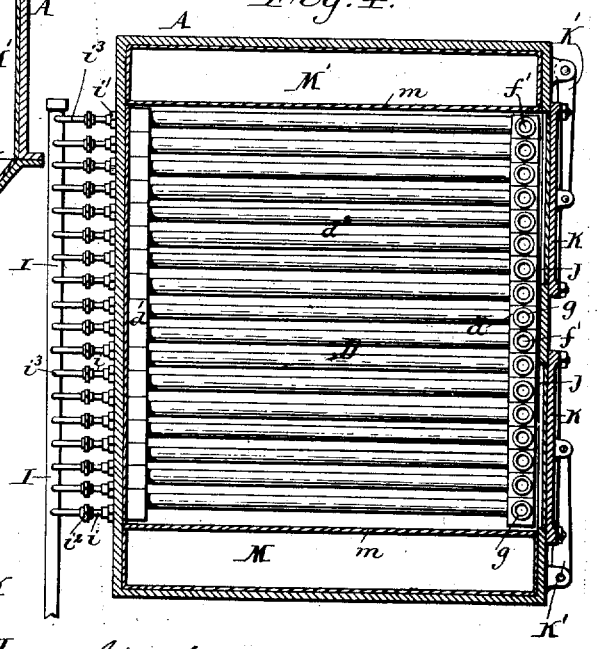
Figure 5:
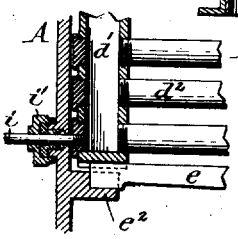
Figure 6:
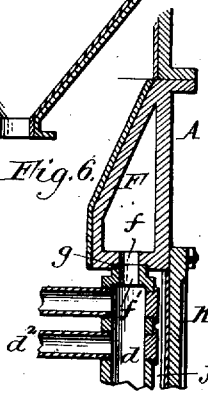
Figure 7:
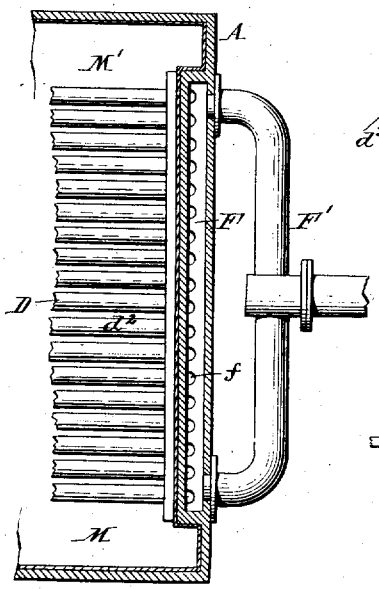
Figure 8:
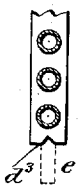
Figure 10:
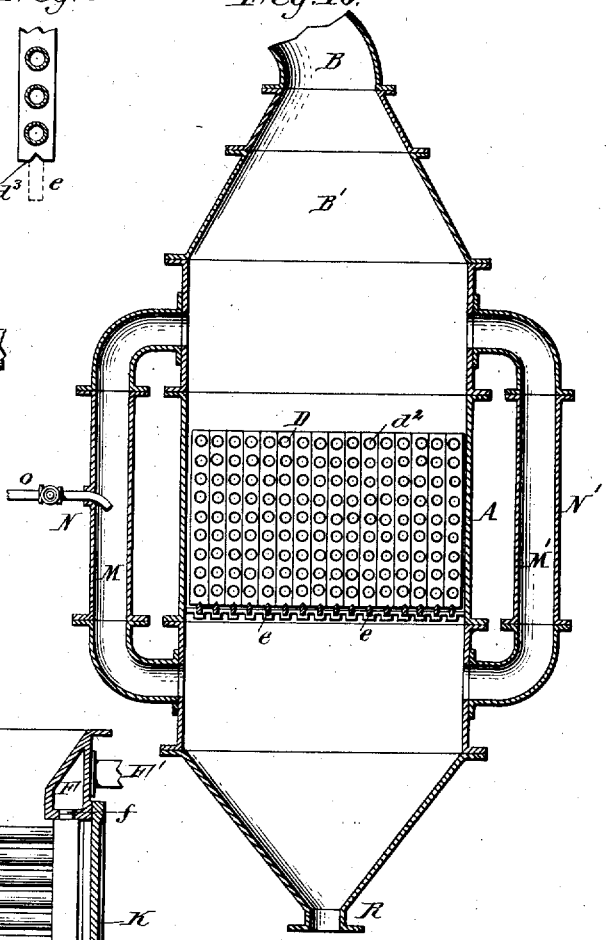
Figure 9:
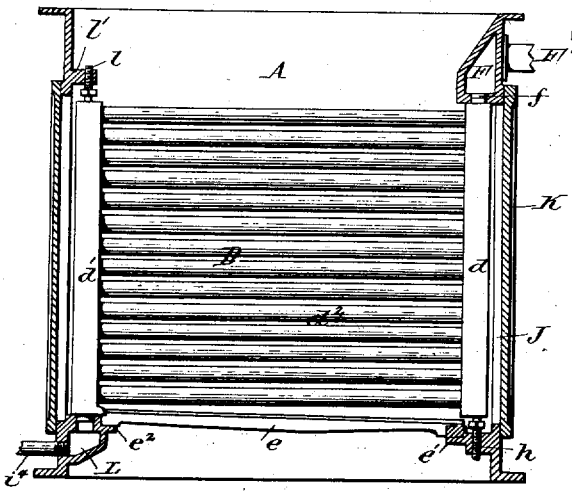
Figure 11:
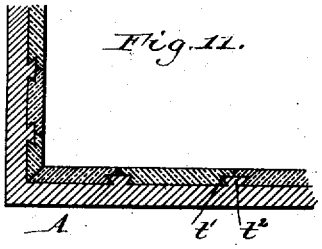

In the accompanying drawings, consisting of three sheets, Figure 1 is a front elevation of my improved evaporating-pan. Fig. 2 is a vertical section thereof on an enlarged scale. Fig. 3 is a similar view of the central portion of the pan at right angles to Fig. 2, on a still further enlarged scale. Fig. 4 is a horizontal section of the pan. Fig. 5 is a fragmentary vertical section of the discharge-manifold of one of the heating-sections, showing the drip-pipe connected therewith. Fig. 6 is a cross-section of the horizontal supply-manifold and one of the manifolds of a heating-section connected therewith. Fig. 7 is a fragmentary horizontal section of the pan, taken through the main supply-manifold. Fig. 8 is an end view of the lower portion of one of the heating-sections. Fig. 9 is a vertical section of the central portion of the pan, showing a modified manner of securing the heating-sections in the pan. Fig. 10 is a vertical section of the pan, showing a modified construction of the circulating-passages. Fig. 11 is a horizontal section of a portion of the pan, showing the manner of securing the glass plates to the walls thereof.

Like letters of reference refer to like parts in the several figures.

A represents the main portion of the evaporating-pan forming the heating-chamber, and constructed preferably of square or rectangular form.

B represents a pipe connected with the tapering top B′ of the pan, and through which the vapor produced by the evaporation of the brine is drawn from the pan into a condenser C by an air-pump or other means. This condenser may be of any ordinary construction.

D represents the vertical sections of heating-pipes arranged side by side in the chamber A of the pan, and each composed of upright supply and discharge manifolds $d$ $d'$, and a vertical series of horizontal pipes $d^2$, connected at their ends to the upright manifolds. The heating-sections D are supported upon horizontal guide-bars $e$, which rest with their ends in recesses arranged in horizontal ledges $e'$ $e^2$, formed on the inner sides of the front and rear walls of the evaporating-pan, as shown in Figs. 2, 3, and 5. The upper edges of these guide-bars are preferably beveled and enter V-shaped grooves $d^3$, formed in the bottom of the manifolds $d$ $d'$, as shown in Fig. 8. By this construction the several sections are guided into their proper places in introducing the same into the heating-chamber and are firmly supported in place.

F represents a horizontal steam-chamber or main-supply manifold arranged within the heating-chamber A and extending across the upper ends of the supply-manifolds $d$. The main manifold F is provided in its bottom with openings $f$, which register with the openings $f'$ in the upper ends of the supply-manifolds. The latter are provided at their upper ends with projecting nipples $g$, which fit into sockets or depressions formed in the bottom of the main manifold F, washers or packings being interposed between the nipples and said sockets to form tight joints.

$h$ represents vertical set-screws or bolts arranged in threaded openings in the ledge $e'$, and bearing with their upper ends against the bottoms of the supply-manifolds $d$, whereby the latter are forced upwardly against the bottom of the main manifold F and are securely held in place. The heating-sections are in this manner secured only at one end, and are free to expand and contract at their opposite ends under the influence of the heat. Steam is supplied to the main manifold F by a pipe F′.

*i* represents drip-pipes entering the discharge-manifolds *d′* at or near their bottoms, and whereby the condensed steam is discharged from said manifolds. These drip-pipes pass outwardly through packing or stuffing boxes *i′*, arranged in the rear wall of the evaporating-pan, and are all connected with a main drip-pipe I by screw-unions $i^2$ and pipes $i^3$, as represented in Figs. 3 and 4. The main drip-pipe is connected with a steam-trap or other receptacle to which the water of condensation is to be conducted. The drip-pipes *i* are screw-threaded at their inner ends and fit in screw-threaded openings formed in the discharge-manifolds, so that the drip-pipes can be readily unscrewed from the sections when it is desired to remove the latter from the pan.

J represents openings formed in the front wall of the heating-chamber A, through which the heating-sections can be removed from the pan. These openings are closed by doors or plates K, which are bolted to the outer side of the pan. The doors K are pivoted centrally at their top and bottom to swinging arms or frames K′, which are hinged to the front wall of the pan, as clearly shown in Figs. 1 and 4. This construction enables the doors K to be easily swung toward and from the openings J and to seat themselves squarely against the front wall of the pan, so as to form a tight joint therewith when bolted in place.

It is obvious that a single opening and door may be used, if preferred; but when the doors are very large and heavy I prefer to use two openings and doors, although this latter construction compels the heating-sections between the doors to be moved laterally in the pan before they can be removed.

The heating-sections are removed by loosening the set-screws *h* and unscrewing the drip-pipes *i* from the sections and then sliding the sections outwardly upon the guide-bars through the openings in the pan. Whenever any of the sections require to be removed from the pan for freeing the heating-pipes from incrustations, this can be readily accomplished, and, upon a section being removed, full access can be had to each of the heating-pipes, and the same can be thoroughly cleaned without disturbing the steam-tight joints in the manifolds.

If desired, the heating-sections may be secured at both ends, as represented in Fig. 9. In this case the pan is provided with a horizontal discharge chamber or manifold L, formed within the heating-chamber below the discharge-manifolds *d′* of the sections, and upon which the latter rest and with which they communicate. The upright discharge-manifolds *d′* are pressed down against the upper side of the horizontal manifold L by set-screws *l*, arranged in a horizontal ledge *l′* formed on the inner side of the heating-chamber, above the manifolds and bearing against the upper ends of the latter. In this construction a single drip-pipe $i^4$ is connected with the horizontal manifold L for discharging the water therefrom.

M M′ represent descending circulating-passages arranged within the evaporating-pan, between the heating-sections D and the walls of the pan, and connecting the portions of the pan above and below the heating-sections, so as to cause a circulation of the brine from the top to the bottom of the pan on the outer sides of the heating-sections. The passages M M′ are preferably arranged on opposite sides of the pan, and are separated from the heating-sections by upright partitions *m*, secured to the front and rear walls of the pan. Instead of being located within the pan, as shown in Figs. 2 and 4, these circulating-passages may be arranged on the outer side of the pan, as represented in Fig. 10, the passages being formed in this case by pipes N N′, the ends of which are connected, respectively, with the portions of the pan above and below the sections of heating-pipes. I prefer, however, to employ the interior circulating-passages, as by this construction less heat is lost by radiation than by the construction represented in Fig. 10, in which the exterior passages are exposed to the external atmosphere on all sides. The brine flows upwardly through the nest of heating-pipes in the central portion of the pan and downwardly through the outer descending passages, and this downward movement of the brine causes the salt crystals which have been formed in the upper portion of the pan to be carried down below the heating-pipes, and prevents the crystals from coming in contact with and adhering to the heating-pipes. The crystals, being heavier than the brine, descend to the bottom of the lower portion of the pan.

O represents the brine-supply pipe, whereby the brine is introduced into the evaporating-pan from a supply-tank, and which enters one of the circulating-passages M M′, preferably at about the center thereof, thereby locating the brine-supply below the level of the brine in the pan.

P represents observation-windows, of glass or other transparent material, arranged in the walls of the evaporating-pan at different elevations and through which the condition of the charge may be examined.

*q* represents water-pipes entering the evaporating-pan and terminating on the inner side of the pan, near the windows or panes P, whereby said windows may be cleaned from adhering salt crystals by directing a stream of water against the inner sides thereof. The water-pipes *q* are connected with a main supply-pipe Q, into which water is conducted from any convenient source.

R represents the discharge-pipe, arranged at the lower end of the evaporating-pan, and R′ is a valve whereby the discharge of the salt through said pipe is controlled. This valve is liable to become clogged by adhering incrustations, and to clean the valve and its casing from time to time a washing-pipe $r$ is connected with one side of the casing of the valve, which receives its supply from the pipe Q, and a waste-pipe $r'$ is connected with the opposite side of the valve-casing, through which the washing-water is discharged after it has passed through the valve.

S represents a receiving chamber or vessel connected with the discharge-pipe R, and into which the crystals of salt drop as fast as they are carried down by the descending currents. The valve R′ is open during this operation, and the lower valve $R^2$ of the receiving-vessel is closed. When the receiving-vessel has been filled with salt, the upper valve R′ is closed and the salt is discharged by opening the lower valve $R^2$, the vessel S being provided near its upper end with a suitable air-inlet cock for facilitating the discharge of its contents.

The inner metallic surface of the evaporating-pan is lined with plates of glass, porcelain, or other non-corrosive material which will resist the action of the brine, so as to protect the inner metallic surface of the pan and prevent the salt from being affected or discolored by coming in contact with the metal. These glass plates are provided on their rear sides with dovetail grooves $t'$, which fit over dovetail ribs or tenons $t^2$, formed on the inner sides of the walls of the pan, whereby the plates are secured to the walls, as shown in Fig. 11.

In the practical operation of the apparatus the brine stands about one foot above the heating-sections in the pan.

The steam employed for heating the brine may be either live steam or exhaust-steam, as may be preferred.

I am aware that heating-pipes have been made removable from the pan, and I do not broadly claim such construction.

I claim as my invention—

1. The combination, with an evaporating-pan having an opening in one of its walls for the insertion and removal of heating-sections, of independent removable heating-sections, each forming a separate closed steam-chamber having a steam-inlet and a drip-outlet and capable of being removed complete through the opening in the wall of the evaporating-pan, substantially as set forth.

2. The combination, with an evaporating-pan provided with a steam-supply manifold and with an opening in one of its walls for the insertion and removal of heating-sections, of independent removable heating-sections each forming a separate closed steam-chamber having a steam-inlet and a drip-outlet and detachably connected with said supply-manifold, whereby each section can be removed complete through said opening without disturbing said supply-manifolds, substantially as set forth.

3. The combination, with an evaporating-pan provided with a steam-supply manifold and having in one of its walls an opening for the insertion and removal of heating-sections, of independent removable heating-sections each forming a separate flat-sided steam-chamber, the several sections being arranged with the flat sides adjacent to each other and detachably connected with the supply-manifold, substantially as set forth.

4. The combination, with an evaporating-pan provided with a steam-supply manifold and with an opening in one of its walls for the insertion and removal of heating-sections, of independent removable heating-sections, each forming a separate closed steam-chamber detachably connected to said manifold and having a steam-inlet and a drip-outlet, drip-pipes connected with the outlets of the sections, and stuffing-boxes in the walls of the pan, through which the drip-pipes pass, substantially as set forth.

5. The combination, with an evaporating-pan provided with a steam-supply manifold and with an opening in one of its walls for the insertion and removal of the heating-sections, of removable heating-sections bearing against the supply-manifold, and adjusting-screws supported on the pan and bearing against the heating-sections, whereby the latter are pressed against the supply-manifold, substantially as set forth.

6. The combination, with an evaporating-pan, of flat heating-sections, each composed of a row of heating-pipes and manifolds with which the pipes are connected, the several sections being independent of each other and arranged with their flat sides adjacent to each other and the pan being provided in one of its upright walls with an opening through which each section can be removed, substantially as set forth.

7. The combination, with an evaporating-pan, of flat removable heating-sections, each composed of a row of heating-pipes and manifolds with which the pipes are connected, the several sections being independent of each other and arranged with their flat sides adjacent to each other, and a supply-manifold secured to the pan and communicating with each heating-section, substantially as set forth.

8. The combination, with an evaporating-pan, of flat removable heating-sections, each composed of a row of heating-pipes and manifolds with which the pipes are connected, the several sections being independent of each other and arranged with their flat sides adjacent to each other, and circulating-passages arranged outside of the heating-sections and connecting the portions of the pan above and below the heating-sections, substantially as set forth.

9. The combination, with the evaporating-pan, of removable vertical sections of heating-pipes arranged side by side within the pan and guide-bars arranged in the pan underneath the sections, substantially as set forth.

10. The combination, with the evaporating-pan, of removable vertical sections of heating-pipes arranged side by side within the pan, each composed of end manifolds and connecting-pipes, and beveled guide-bars arranged in the pan and entering grooves in the lower ends of the manifolds, substantially as set forth.

11. The combination, with the evaporating-pan, of removable vertical sections of heating-pipes arranged side by side within the pan, each composed of end manifolds and connecting-pipes, a horizontal supply-manifold communicating with the supply-manifolds of the sections, drip-pipes attached to the discharge-manifolds of the sections, and packing-boxes in the wall of the pan, through which the drip-pipes pass, substantially as set forth.

12. The combination, with the evaporating-pan, the sections of heating-pipes, each provided with an end manifold, and a main manifold extending across the ends of the section-manifolds and secured in the pan, of adjusting-screws attached to the pan and bearing against the section-manifolds, whereby the latter are pressed against the main manifold, substantially as set forth.

Witness my hand this 29th day of March, 1889.

JOSEPH M. DUNCAN.

Witnesses:
A. B. SMITH,
C. W. HOUGH.